UNITED STATES PATENT OFFICE.

CHRISTIAN RUDOLPH, OF OFFENBACH-ON-THE-MAIN, GERMANY, ASSIGNOR TO THE FIRM OF K. OEHLER, OF SAME PLACE.

RED-BLUE DIAZO DYE.

SPECIFICATION forming part of Letters Patent No. 579,773, dated March 30, 1897.

Application filed December 2, 1893. Serial No. 492,599. (Specimens.) Patented in England November 20, 1893, No. 22,204.

*To all whom it may concern:*

Be it known that I, CHRISTIAN RUDOLPH, chemist, a subject of the Emperor of Germany, and a resident of Offenbach-on-the-Main, in the Empire of Germany, have invented new and useful Improvements in the Method of Producing Azo Dyestuffs from Alpha$_1$ Alpha$_4$ Amido-Oxynaphthalene Beta$_2$ Beta$_3$ Disulfo-Acid, (and for which I have obtained Letters Patent of Great Britain, No. 22,204, dated November 20, 1893,) of which the following is a specification.

The intermediate compound obtained in an alkaline solution from one molecule of a paradiamin and one molecule of alpha$_1$ alpha$_4$ amidoöxynaphthalene beta$_2$ beta$_3$ disulfo-acid yields new and valuable azo dyestuffs when further combined with one molecule of an aromatic amin or phenole. From the whole series of these dyestuffs, which dye cotton without mordant, I have especially produced the following two:

Tolidin or benzidin $\Big\{$ $\Big\langle$ Azoalpha$_1$alpha$_4$amidoöxynaphthalene beta$_2$beta$_3$disulfo-acid
Azo 2, 3 dioxynaphthalene.

My way of proceeding is as follows: Eleven parts by weight of tolidin or 9.2 parts of benzidin are dissolved in seventy-five parts of hydrochloric acid of 12.5 per cent. and five hundred parts of water. After cooling to 0° centigrade I add seven parts of nitrite of sodium. This solution of tetrazo-ditolyl or tetrazo-diphenyl chlorid is poured at once into another solution cooled with ice to 0° centigrade of eight parts of caustic soda and of eighteen parts of the acid potassium salt of alpha$_1$ alpha$_4$ amidoöxynaphthalene beta$_2$ beta$_3$ disulfo-acid. After a short time a dissolution of eight parts of 2.3 dioxynaphthalene and of four parts of caustic soda in one hundred parts of water is added. The mixture is allowed to stand for twenty-four hours and is then heated. The dyestuff is precipitated by common salt, filtered off, pressed, and dried.

The formula in accordance with which the herein-described dyestuff is produced may be expressed as follows:

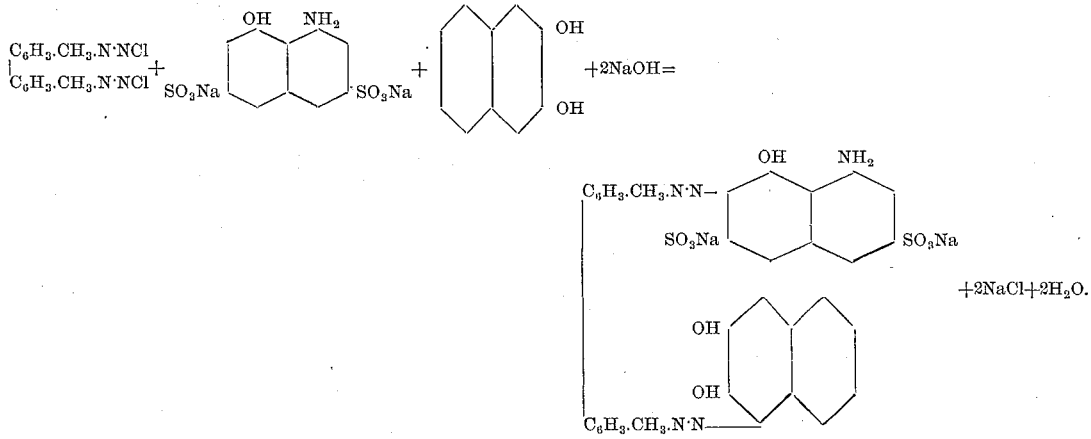

The dyestuffs form a dark blackish-brown powder with a feeble metallic luster. They are soluble in water with a violet and in concentrated sulfuric acid with a blue color. They dye unmordanted cotton pure red-blue.

What I claim, and desire to secure by Letters Patent, is—

1. The method of producing red-blue diazo dyestuffs by the combination of tetrazo-ditolyl—or tetrazo-diphenyl with one molecule of $alpha_1$ $alpha_4$ amidoöxynaphthalene $beta_2$ $beta_3$ disulfo-acid in an alkaline solution and then combining the intermediate compound thus obtained with one molecule of 2.3 dioxynaphthalene.

2. As a new article of manufacture, the dyestuffs derived from tetrazo-diphenyl with one molecule of $alpha_1$, $alpha_4$ amidoöxynaphthalene $beta_2$, $beta_3$ disulfo-acid in an alkaline solution, combined with one molecule of 2.3 dioxynaphthalene, which dyestuff is a dark, blackish-brown powder with a feeble metallic luster, soluble in water with a violet and in concentrated sulfuric acid with a blue color and which dyes unmordanted cotton pure red-blue.

In testimony whereof I have signed my name to this specification in the presence of two subscribing witnesses.

CHRISTIAN RUDOLPH.

Witnesses:
    JEAN GRUND,
    FRANK H. MASON.